United States Patent [19]
Creasy

[11] Patent Number: 4,847,324
[45] Date of Patent: Jul. 11, 1989

[54] HYDROPHILIC POLYVINYLBUTYRAL ALLOYS

[75] Inventor: Walter S. Creasy, Bridgewater, N.J.

[73] Assignee: Hydromer, Inc., Whitehouse, N.J.

[21] Appl. No.: 186,106

[22] Filed: Apr. 25, 1988

[51] Int. Cl.$^4$ ............................................... C08L 29/00
[52] U.S. Cl. ......................................... 525/57; 525/58
[58] Field of Search ..................................... 525/57, 58

[56] References Cited

U.S. PATENT DOCUMENTS

| | | | |
|---|---|---|---|
| 4,100,309 | 7/1978 | Micklus et al. | 427/2 |
| 4,119,094 | 10/1978 | Micklus et al. | 128/132 R |
| 4,373,009 | 2/1983 | Winn | 428/424.2 |
| 4,472,467 | 9/1984 | Tamaki et al. | 427/444 |
| 4,478,927 | 10/1984 | Naito et al. | 430/203 |
| 4,481,326 | 11/1984 | Sonenstein | 525/57 |
| 4,642,267 | 2/1987 | Creasy et al. | 428/413 |

OTHER PUBLICATIONS

*Polymer Blends*, vol. 1, Academic Press, N.Y., 1978, Paul and Newman ed., p. 87.
*Encyclopedia of Polymer Science and Technology*, vol. 14, Mark and Gaylord ed., pp. 221–227 and 231–235 (1971).
*The Handbook of Water Soluble Gums and Resins*, McGraw-Hill, 1980, R. Davidson, ed., pp. 21-8 to 21-11.

Primary Examiner—Melvyn I. Marquis
Assistant Examiner—Susan Berman
Attorney, Agent, or Firm—Hoffmann & Baron

[57] ABSTRACT

A hydrophilic polymer blend is disclosed which comprises a first polymer component which is an organic solvent-soluble, thermoplastic polyvinylbutyral (PVB) and a second polymer component which is a hydrophilic poly(N-vinyl lactam), e.g., a water soluble polyvinylpyrrolidone. The blend demonstrates slipperiness in aqueous environments and, among other applications, is useful in low-friction coatings for a wide variety of substrates. A method for providing the coatings is also described.

8 Claims, No Drawings

HYDROPHILIC POLYVINYLBUTYRAL ALLOYS

BACKGROUND OF THE INVENTION

This invention relates to the field of polymer blends, or alloys, and more particularly, to hydrophilic blends of polyvinylbutyral (PVB) and poly(N-vinyl lactam) and to the use of these blends in a variety of applications including the formulation of lubricious coating compositions.

There has long been a need in the art for lubricious materials which are non-slippery when dry but exhibit lubricious or slippery properties when contacted with aqueous fluids. Applications for such materials are numerous and diverse and include fabrication into surface coatings, foams, fibers, films, or solid articles which absorb water, impart wettability or reduce the coefficient of friction in aqueous environments. Uses include, but are not limited to, coatings for catheters, condoms, invasive devices and test probes which are lubricious only when wet, antifog coatings for lenses, windows, etc., drag reducing coatings for ships, burn and wound dressings, contact lenses, antistatic coatings, hydrophilic fibers and matrices for controlled release of pharmaceuticals, dyes, fragrances, salts and the like. It had previously been proposed to reduce the coefficients of friction of these and similar devices and materials by the use of non-permanent coatings of silicone or certain fluorocarbons, neither of which are hydrophilic, and which do not have as low coefficients of friction as are necessary or desirable for some applications. The fluorocarbon coatings also have the disadvantage of being difficult to handle because they are always slippery, not just when slipperiness is desired.

Coatings and articles useful for insertion into the body, for example, are described in U.S Pat. Nos. 4,100,309 and 4,119,094. Articles such as catheters and condoms described in these patents are obtained by coating a suitable substrate with a polyvinylpyrrolidone-polyurethane interpolymer. The coatings are obtained by using a solution of isocyanate containing prepolymer and polyurethane, with a solution of polyvinylpyrrolidone. The isocyanate can be modified with chain extenders (diols, etc.) which effectively produce a high molecular weight polyurethane in situ. The requirement that reactive isocyanates be present introduces unavoidable chemical instability (pot life) and eliminates the possibility of utilizing aqueous or alcoholic solvents for preparation. Isocyanates will also react with and inactivate many desirable additives such as pharmaceuticals, surfactants and dyes.

U.S. Pat. Nos. 4,373,009 and 4,472,467 describe similar compositions. These patents, however, require a chemical reaction forming a covalent bond between isocyanates and active hydrogen groups reactive toward isocyanate on the vinyl lactam or ethylene oxide polmers to produce the objects of the invention. These patents actually teach away from the use of chemically inert components.

U.S. Pat. No 4,642,267 describes hydrophilic blends of polyvinylpyrrolidone and linear preformed polyurethanes which afford low friction surfaces when wet. Limiting the hydrophobic component to polyurethanes restricts the utility of such alloys in certain applications, in particular where concerns of low cost, hydrolysis stability and food packaging regulations are paramount.

Polyvinylpyrrolidone, a commercially available poly (N-vinyl) lactam, is a well known hydrophilic, polymer having numerous applications including being a film former, protective colloid and suspending agent, dye-receptive resin, binder and stabilizer, physiologically acceptable polymer, etc. However, being water soluble, polyvinylpyrrolidone and related poly (N-vinyl) lactams will eventually be leached from coating compositions and other materials formulated with the polymer when contacted with aqueous fluids. Thus, the practical value of known compositions containing polyvinylpyrrolidone as lubricious coatings, other than the compositions claimed in U.S. Pat. Nos. 4,100,309, 4,119,094, 4,642,267 and others cited above, is greatly limited due to the erosion of their lubricious properties as the polyvinylpyrrolidone component dissolves or is leached into the surroundings aqueous medium.

The Handbook of Water Soluble Gums and Resins (McGrawHill, 1980) lists many polymers which form "compatible" solvent blends with PVP, including polyvinylbutyral However, no mention is made of any unexpected insolubility resulting from such combination, nor are any frictionreducing properties described In fact, the solvent combination appears to be critical to the preparation of homogeneous coatings with useful properties.

SUMMARY OF THE INVENTION

It has been discovered that high molecular weight polyvinylbutyral (PVB) resin can be blended, or alloyed, with polyvinylpyrrolidone and/or other poly(N-vinyl lactams) by the use of a common solvent or solvent mixture The resulting blends generally exhibit properties intermediate those of the PVB component and those of the poly(N-vinyl lactam) component, e.g., blends which readily absorb water to become soft and slippery (predominantly made up of the hydrophilic poly(N-vinyl lactam component) or blends which are relatively hard but still wettable (predominantly made up of the PVB component). In virtually all cases, blends containing a sufficient quantity of poly(N-vinyl lactam) to provide useful degrees of hydrophilicity will also exhibit significantly reduced coefficients of friction when wet.

In accordance with the present invention, a hydrophilic polymer blend is provided which comprises a first polymer component which is an organic solvent soluble, thermoplastic polyvinylbutyral resin and a second polymer component which is a hydrophilic poly(N-vinyl lactam)

Unlike the procedure used for making the coatings of U.S. Pat. Nos. 4,100,309, 4,119,094, 4,373,009 and 4,472,467 Which utilizes a solution of highly reactive isocyanate, the polymer blend of this invention is prepared with a preformed polymer having no reactive isocyanate groups, as such being stable in solution for indefinite periods of time. Accordingly, polymer blends herein can be readily formed at the point of application as needed simply by evaporating any solvent(s) with which they may be associated. This versatility makes the instant products especially convenient for use as coatings.

Contrary to what one would expect exposure of the blends of this invention to water, even for prolonged periods, does not result in any significant loss of the hydrophilic poly(N-vinyl lactam) component, possibly as a result of associative forces with the PVB component, chain entanglement, or both. Whatever may, in fact, be the basis for this property, the ability of the blends to retain their slippery properties when wet makes them highly useful as low friction coatings which will be in more or less constant or prolonged contact with aqueous fluids.

DESCRIPTION OF THE PREFERRED EMBODIMENT

Polyvinylbutyral resins are commercially available materials, which usually range in molecular weight from 35,000 to 150,000. They generally contain some level of hydroxyl functionality and for the purposes of the present invention this is not critical. Changes in hydrophilic character of the blend resulting from variations in hydroxyl content of the PVB can be countered by adjustments in the amount of poly(N-vinyl lactam). Polyvinylbutyral resins are further described in the *Encyclopedia of Polymer Science and Technology*, Mark, et al., (eds.), Wiley, 1969, which is incorporated herein by reference.

Although the useful polymers are essentially linear in order to provide solubility, they can be crosslinked following blending with the poly(N-vinyl lactam) component, e.g., by adding a sufficient quantity of crosslinking agent to a solvent solution of the polymers. Examples of crosslinking agents which can be utilized for this purpose are isocyanates, polycarboxylic acids, peroxide and organotitanates.

The term "poly(N-vinyl lactam)" as used herein shall be understood to include homopolymers and copolymers of such N-vinyl lactams as N-vinylpyrrolidone, N-vinylbutyrolactam, N-vinylcaprolactam, and the like, as well as the foregoing prepared with minor amounts, for example, up to about 20 weight percent, of one or a mixture of other vinyl monomers copolymerizable with the N-vinyl lactams. Of the poly(N-vinyl lactams), the polyvinylpyrrolidone (PVP) homopolymers are preferred. A variety of polyvinylpyrrolidones are commercially available from several sources and of these, a polyvinylpyrrolidones having K-values of about 30 to 90 are especially preferred.

The polyvinylbutyral and poly(N-vinyl lactam) components of the blend can be combined by dissolving them in solvent which is subsequently evaporated to yield the blend. If the latter procedure is selected, the choice of solvent is important. Thus, the solvent must be capable of dissolving both polymer components in a single-phase solution and the relative volatilities must be such that at no point during evaporation and drying, the resulting mixture will tend to precipitate either PVB, poly(N-vinyl lactam) or an association complex of these polymers which may have different solubility characteristics than either material by itself. Solvents which are suitable include isopropanol, methyl ethyl ketone, diacetone alcohol, ethyl lactate, methylene chloride, trichloroethylene, N-methyl pyrrolidone and mono and di-ethylene glycol ethers. Other solvents can be added to accelerate drying, reduce solvency toward particular substrates, etc., provided the aforestated conditions are met. An improper combination of solvents will result in coatings which are not homogeneous in composition, and which will soften and swell so much as to be useless. For example, even though both polymers are soluble in isopropanol, this solvent yields weak, watery coatings when used alone. The same composition with added diacetone alcohol affords coatings with a high degree of lubricity plus surprising abrasion resistance.

The blends can contain from about 10 to about 80 percent, and preferably from 25 to about 60 weight percent, of PVB, the balance being made up of the poly(N-vinyl lactam) component. Minor quantities, for example, up to about 20 weight percent, of one of a mixture of other compatible polymers can be incorporated into the blends, e.g., any of the polymers disclosed in General Aniline & Film Corporation Technical Bulletin 7583-033.

The blends can be formed into a variety of shapes and, if desired, can be fabricated into foams employing known and conventional techniques including the use of chemical and/or physical blowing agents. The solid blends can also be extruded as fibers, rods, sheets, and so forth.

Many different types of additional materials can be incorporated into the polymer blends herein including organic and inorganic salts, alcohols, amines, acids, polymer latices, resin or wax dispersions, fillers, fibers, cellulosics, surfactants, pigments, dyes, fragrances, and so forth. The blends of this invention are especially useful as carriers for a wide variety of releasable materials including biologically active substances having curative or therapeutic value for human beings or non-human animals. Included among the biologically active materials which are suitable for incorporation into the blends of the present invention are: hypnotics, sedatives, tranquilizers, anti-convulsants, muscle relaxants, antiparkinson agents, analgesics, antipyretic agents, antiinflamatory agents, local anesthetics, antispasmodics, antiulcer agents, antivirals, antibacterials, antifungals, antimalarials, sympathomimetic agents, cardiovascular agents, diuretics, antiparasitic agents, antitumor agents and hypoglycemic agents, and so forth.

In the form of a sheet or film or as a coating, the blends can be combined with and adhered to a virtually unlimited variety of substrates including metal and resin foils, woven and non-woven webs of natural and synthetic fibers, etc.

The following examples are further illustrative of the blends of this invention.

EXAMPLE 1

To a mixture of 20 g isopropanol, 40 g methyl ethyl ketone and 20 g diacetone alcohol was added 0.8 g polyvinylbutyral (XYHL resin, Union Carbide Corp.) and 2.4 g polyvinylpyrrolidone (Povidone 90, GAF Corp.).

The resulting clear solution was applied to a length of PVC tubing and dried in an oven at 60° C. for 15 min.

The dried coating was hard, clear and colorless, and absorbed water becoming highly lubricious (coefficient of friction =0.039).

The lubricity was unchanged after soaking in water for 72 hrs. (coefficient of friction =0.039). Rubbing briskly with a paper towel did not remove the coating or alter its slippery nature.

Similar results are obtained when the coating solution is applied to a polyurethane catheter and an acrylic coated steel plate.

EXAMPLE 2

To the solvent mixture of Example 1 was added 1.5 g polyvinylbutyral resin and 1.5 g polyvinylpyrrolidone. Coatings deposited from this solution were also hard, clear and colorless when dry. Exposure to water resulted in noticeable lubricity, though significantly less than in Example 1 (coefficient of friction =0.09).

This coating is useful as an anti-fog or anticondensation coating on lenses, mirrors and films where it must resist smudging from handling abuse. It would also be suitable for numerous applications which require repeated use, or exposure to abrasive elements. The coating's hydrophilic behavior was unchanged after soaking in water for 3 days.

EXAMPLE 3

To the composition of Example 2 was added a polyethylene glycol distearate surfactant, 0.3 g (10% based on non-volatile weight). Coatings prepared from such a mixture have improved wetting properties which are not lost by extended exposure to condensation; as in a greenhouse.

EXAMPLE 4

To 80 g of isopropanol were added 0.8 g polyvinylbutyral resin and 2.4 polyvinylpyrrolidone. Coatings deposited from this clear solution on a PVC tube were hard, clear and colorless when dry. However, after soaking in water for 1 hr., the coating was extremely soft and watery and was easily abraded from the surface. On drying, the coating had a whitish appearance suggesting microvoids from leaching of a soluble component.

EXAMPLE 5

To a mixture of 50 g methyl ethyl ketone, 25 g isopropanol and 25 g diacetone alcohol was added 1 g polyvinyl butyral and 3 g of polyvinylpyrrolidone/2 acrylamidopropylmethylsulfonate copolymer (98/2). Coatings formed on a PVC substrate were clear and colorless. When wetted with water, the coatings became highly lubricious (coefficient of friction 0.022), with no evidence of soluble material or change in character. The lubricity was unchanged after soaking 3 days in water.

EXAMPLE 6

To a mixture of 50 g methyl ethyl ketone, 25 g isopropanol and 25 g diacetone alcohol was added 1 g polyvinyl butyral and 3 g of polyvinylpyrrolidone/2 ethylhexylacrylate copolymer (95/5). Coatings formed on a PVC substrate were clear and colorless. When wetted with water, the coatings became highly lubricious (coefficient of friction 0.059), with no evidence of soluble material or change in character. The lubricity was unchanged after soaking 3 days in water.

EXAMPLE 7

To the solution in Example 1 was added 8 g of a 10% solution of Estane 5703 polyurethane resin in diacetone alcohol solvent. A clear solution resulted which yielded clear coatings on PVC and polyurethane films. When wetted with water, the coatings were determined to have slightly less lubricity versus those of Example 1 (coefficient of friction =.072), but considerably more abrasion resistance. After 3 days' soaking in water, the coefficient of friction had decreased to 0.05, representing an increase in hydrophilic character.

EXAMPLE 8

The solution in Example 1 was modified by adding 4 g 20% polyvinyl chloride (Union Carbide VMCH) in methyl ethyl ketone solvent. Coatings deposited from this composition on polycarbonate were clear and colorless when dry, but slightly hazy when wet. Lubricity was much reduced and abrasion resistance greatly improved versus the properties observed in Example 1. However, the coatings were still sufficiently hydrophilic to function well as anti-fog treatments when exposed to warm, moist air. Coefficients of friction were 0.15 initially, and 0.18 after soaking in water for three days.

Thus, while there have been described what are presently believed to be the preferred embodiments of the present invention, those skilled in the art will realize that other changes and modifications can be made without departing from the spirit of the invention, and it is intended to include all such changes and modifications as come within the true scope of the invention.

What is claimed is:

1. A stable hydrophilic polymer blend which comprises a first polymer component which is an organic solvent soluble performed thermoplastic, polyvinylbutyral (PvB) resin and a second polymer component which is a hydrophilic poly (N-vinyl lactam), said blend having been prepared in a solvent selected from the group consisting of isopropanol, methyl ethyl ketone, diacetone alcohol, ethyl lactate, methylene chloride, trichloroethylene, N-methyl pyrrolidone, mono and di-ethylene glycol ethers, and blends thereof, and said hydrophilic polymer blend being capable of withstanding exposure to water without significant loss of said hydrophilic poly (N-vinyl lactam).

2. The polymer blend of claim 1 wherein the poly(N-vinyl lactam) is a water soluble polyvinylpyrrolidone homopolymer.

3. The polymer blend of claim 1 wherein the poly (N-vinyl lactam) is a poly (N-vinyl caprolactam) homopolymer.

4. The polymer blend of claim 1 wherein the poly(N-vinyl lactam) is selected from the group consisting of homopolymer of N-vinyl lactam, copolymer of N-vinyl lactam or blends thereof.

5. The polymer blend of claim in the form of a solid.

6. The polymer blend of claim 1 in the form of a foam.

7. A solvent solution of the polymer blend of claim 1.

8. A film or sheet prepared from the polymer blend of claim 1.

* * * * *